UNITED STATES PATENT OFFICE.

HORATIO D. KNIGHT AND WILLIAM M. WHITESIDE, OF LANCASTER, PA.

IMPROVEMENT IN COMPOSITIONS FOR MOLDS FOR DENTAL PLATES.

Specification forming part of Letters Patent No. 196,300, dated October 23, 1877; application filed May 17, 1877.

*To all whom it may concern:*

Be it known that we, HORATIO D. KNIGHT and WILLIAM M. WHITESIDE, dentists, of Lancaster city, in the State of Pennsylvania, have invented certain Improvements in a Compound for Dental Molds for Plates, of which the following is a specification:

The object of our invention is to produce a compound for making molds that will more effectually resist the action of the heat and pressure to which they are necessarily subjected in forming dental plates from celluloid or other plastic material employed in forming dentures, and so as to retain all the sharpness and the exact shape of the original impression through the entire process, and thereby secure a more perfect fit than is the case when formed in the ordinary molds made from calcined plaster-of-paris or gypsum and water only.

To enable others skilled in the art of dentistry to make and use our compound in forming the molds, a brief statement will suffice, since the manipulation in taking the impression from the roof of the mouth, gums, &c., varnishing, and making ready for molding is no part of our invention; hence we confine our description to our improved compound, which consists of the following well-known ingredients, namely: Plaster-of-paris or calcined gypsum, water-lime or hydraulic lime, and slaked quicklime, all in fine powder.

The proportions and manner of mixing have proved the most satisfactory in their results when compounded in the manner as follows: Take three parts of plaster-of-paris and one part of water-lime, by measure. Then mix intimately, and of this compound take nine parts and add thereto one part of quicklime. These three ingredients, being thoroughly blended, are now ready to be formed into a creamy paste, with common water (or strong lime-water may be used) for mixing, which is then used as when plaster-of-paris alone is employed for making the molds, and need not be specially described, as we claim no novelty save in the compound used and the valuable results thereby obtained.

There are certain considerations and special cases in which the above proportions may be modified, so that we do not confine ourselves to the exact proportions mentioned; but experience has demonstrated that, for general use, the compound, when made substantially as specified, yields the greater satisfaction.

After the matrix is formed from the impression, cleaned, and dried; it is ready to receive the celluloid, and the whole is subjected to heat and pressure to bring the two halves of the flask tightly together in the ordinary manner. It will be found that all the corrugations will be sharp and true, and that there will be no rounding off or displacement, so liable to take place in the use of the ordinary molds.

By the use of this composition a perfect fit is secured, and much time and vexation are saved.

We are aware that water-lime, plaster-of-paris, and quicklime are used in various combinations for forming cements and the like; but we are not aware that any compound as herein specified was ever before known or used for forming molds for any object substantially as and for the purpose herein set forth. Therefore,

What we claim as our invention is—

The combination of calcined gypsum, water-lime and quicklime, substantially in the manner and proportions herein set forth, for the purpose of producing dental molds the better able to resist the necessary pressure and heat while forming plates from plastic materials on which to mount artificial teeth.

H. D. KNIGHT.
W. M. WHITESIDE.

Witnesses:
W. B. WILEY,
HENRY SHUBERT.